United States Patent Office 3,575,717
Patented Apr. 20, 1971

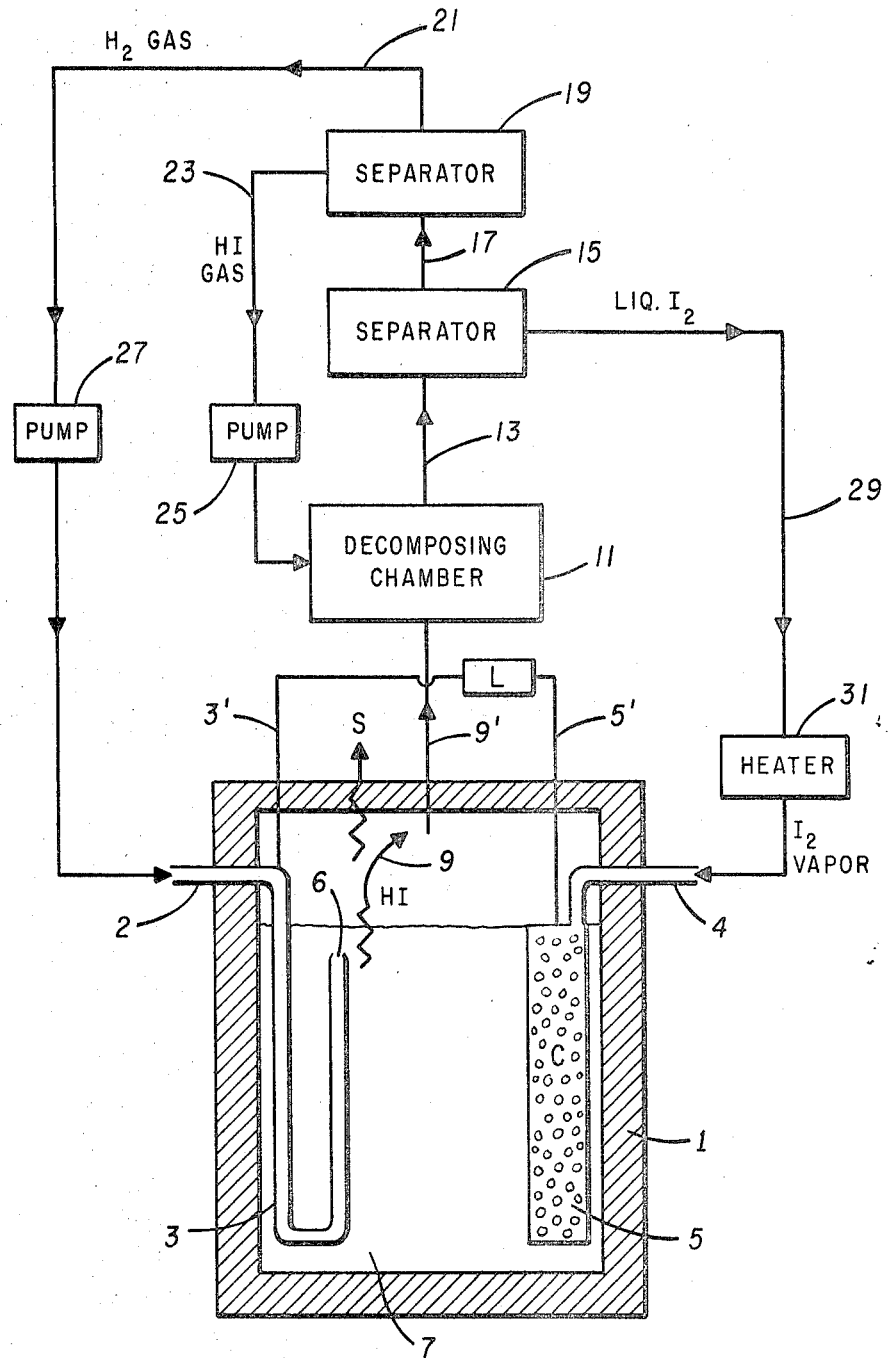

3,575,717
METHOD OF GENERATING POWER IN MOLTEN ELECTROLYTE FUEL CELL
Walter Juda, Lexington, and David McLeod Moulton, Scituate, Mass., and Hans L. Gruber, Innsbruck, Austria; said Juda and Moulton assignors to Prototech Incorporated, Cambridge, Mass., and said Gruber assignor to Atlantic Richfield Company, Philadelphia, Pa.
Continuation of application Ser. No. 336,264, Jan. 7, 1964. This application May 8, 1968, Ser. No. 727,749
Int. Cl. H01m 27/20
U.S. Cl. 136—86
8 Claims

ABSTRACT OF THE DISCLOSURE

Halogen-containing molten electrolyte fuel cell is operated so that the actual output voltage exceeds the standard output voltage. Hydrogen-iodide gaseous reaction product insoluble in the electrolyte is swept out of the electrolyte immediately as formed to keep the reaction product activity low. The reaction product is decomposed and its constituents recycled.

---

This application is a continuation of Ser. No. 336,264, filed Jan. 7, 1964, now abandoned, for "Method of Fuel Cell Operation and Improved Fuel Cell System."

The present invention relates to improved methods of operating fuel cells and to novel fuel cell systems, being more particularly, but not exclusively, directed to improved cells of the molten electrolyte type.

In copending application of the applicant, Walter Juda, Ser. No. 260,457, filed Feb. 25, 1963, now abandoned for continuation Ser. No. 788,687 filed Dec. 24, 1968, for "Fuel Cell System and Method," a novel molten-electrolyte fuel cell is disclosed, embodying a hydrogen or other fuel anode, a halogen cathode, and a molten electrolyte containing ions of the halogen, that provides vastly improved results over prior-art aqueous alkaline or acid cells, and prior-art molten carbonate and solid oxide cells. The successful operation of a hydrogen-iodine cell of the above described character is therein set forth, operating with a molten electrolytic medium maintained at about 485° C., comprising KI, NaI, and KCl—LiCl, embodying a palladium-silver anode and a porous carbon cathode, and producing an unusually high voltage output of 0.94 volt at open circuit. This voltage is far in excess of what was theoretically expected on the basis of considerations of the standard potential that should result when the hydrogen fuel, the iodine oxidant, and the hydrogen iodide reaction product are maintained at the same pressure, say one atmosphere. Such theoretically predictable standard potential, indeed, is of the order of 0.13 volt at open circuit, as contrasted with the many times greater 0.94 voltage obtained in actual practice.

An object of the present invention is to provide a new and improved method of operating fuel cells of the above-described character that will insure the production of output voltages consistently far in excess of the said standard potential voltage, under stabilized operating conditions of the cell.

A further object is to provide a novel fuel cell system operable in accordance with the above-described method.

Still a further object is to provide a novel hydrogen-iodine fuel cell.

An additional object is to provide a novel generalized method of improving the operation of fuel cells in which the reaction product has low solubility in the electrolytic medium.

Still another object is to provide a completely closed fuel-cell cycle system, particularly, although not exclusively, adapted for utilization with the hydrogen-iodine cell.

Other and further objects will be explained hereinafter and will be more particularly pointed out in connection with the appended claims.

In summary, however, from perhaps its broadest aspect, the invention involves a novel method of generating power between fuel cell anode and cathode electrodes, that comprises, maintaining an electrolytic medium between the anode and cathode electrodes in which the product of reaction within the cell has low solubility in the medium, simultaneously introducing gaseous fuel and oxidant into the electrolytic medium at the anode and cathode electrodes to develop predetermined fuel and oxidant activities thereat respectively, extracting electric current from the electrodes, and maintaining the reaction product activity near the region of formation of the reaction product in the electrolytic medium at a value low compared to the said developed activity of at least one of the introduced gases. Preferred constructional details are hereinafter set forth.

The invention will now be described in connection with the accompanying drawing, the single figure of which is a combined longitudinal section and schematic block diagram of a fuel cell system constructed in accordance with a preferred embodiment of the invention, and operating in accordance with the novel method underlying the same.

For purposes of illustration, the invention will be primarily described in connection with the before-mentioned preferred hydrogen-iodine cell of the molten electrolyte type described in the said copending application and summarized above; but it is to be understood that the invention is of more general application to all fuel cells and the like in which the product of reaction has a low solubility in the electrolytic media, as is the case, for example, in molten alkali halide cells using hydrogen and halogen as fuel and oxidant.

Referring to the drawing, the preferred hydrogen-iodine cell is shown disposed within a housing 1, containing a palladium-silver anode 3, illustrated as of the tubular type described in the said copending application, a porous carbon cathode 5, and a molten electrolytic medium 7, maintained therebetween at a temperature in the region of, say, from 450–500° C. The electrolytic medium 7 may, for example, be a combination of KCl—LiCl and KI, providing iodide ions. As described in the said copending application, thte palladium-silver anode 3 is inherently permeable only to hydrogen so that the introduction of pressurized hydrogen fuel at the inlet 2 into the tubular anode 3 results in the passage of the fuel through the permeable walls of the tube 3 into the region of electrolytic medium 7 thereadjacent. Iodine vapor oxidant is shown introduced under pressure at the other inlet 4 into the porous cathode 5, and through the same into the electrolytic medium 7. Clearly, other configurations of the anode than the tubular anode and other cathode configurations, including planar membranes and other shapes, may be used, if desired.

The performance of this type of cell is governed by the following equation, relating the actual output cell voltage E that is obtained between output conductors 3' and 5' across the output circuit, schematically designated as a load L, to which the power generated in the cell is to be delivered, to the before-mentioned standard potential $E_0$:

$$E = E_0 - K \ln \frac{a^2_{HI}}{a_{H_2} \cdot a_{I_2}}$$

As previously stated, $E_0$ is that potential that is to be expected when each of the hydrogen activity (substantially the hydrogen concentration at the anode surface, which is often determined by the pressure), the iodine activity (substantially the iodine concentration at the cathode, which is again often determined by the pressure), and the reaction product (HI) activity (substantially the pressure or concentration) are all at one atmosphere pressure. $E_0$ is theoretically calculable at about 0.13 volt, open circuit, at the above mentioned temperature. K is a constant that is a function of temperature, $a_{HI}$ represents the activity of the hydrogen iodide reaction iodide at 7 (which is substantially the pressure of hydrogen iodide at 9 or concentration of hydrogen iodide in the electrolyte 7) and $\alpha_{H_2}$ and $\alpha_{I_2}$ represent, respectively, the activity or approximately the pressure of the input hydrogen and iodine at 3 and 5, respectively.

It has been discovered, in accordance with the invention, that the activity term $a_{HI}$ above-mentioned is applicable to the region of formation of the reaction product in the cell; namely, proximal to the anode 3 in this illustration.

In the case of iodine, as above intimated, if the hydrogen iodide reaction product can be removed fast enough (or, otherwise stated, can be maintained at sufficiently low activity relative to the activity of the $H_2$ fuel at 3), the second term on the right-hand side of the above equation becomes much greater than the standard potential $E_0$. It will thus be evident that the present invention is concerned with proper conditions of removal of the reaction product HI, or whatever it may be, to insure this greater voltage. One of the necessary conditions underlying this phenomenon is the lack of solubility of the reaction product in the electrolytic medium 7; since appreciable solubility, such as occurs in the case of an aqueous system, provides a high degree of activity of the reaction product in the electrolyte and thus renders the second term on the right-hand side of the equation negligible, restricting the output voltage to substantially the standard potential $E_0$.

In the illustrative case of the hydrogen iodide reaction product, there is negligible solubility of the same in the molten electrolytic medium 7. In this particular cell, moreover, advantage may be taken of the fact that HI appreciably dissociates and that the dissociated hydrogen and iodine are readily separable from each other so that they can be recovered and fed back in appropriate form as fuel and oxidant in a closed-cycle system. Specifically, the reaction product HI is schematically shown in the drawing as removed through a vent 9' to a decomposition chamber 11, where it is subjected to heat, preferably, but not necessarily, in the presence of a catalyst, such as gold or the like. Thermal decomposition of the reaction product is thus effected, the output of which may be fed as at 13 to a separator 15, such as a cooling chamber, which can take advantage of the fact that $H_2$ and $I_2$ may be readily separable by cooling the iodine into a liquid form. There will also be some HI present in the chamber 15 since the thermal decomposition or dissociation is not complete. The gaseous hydrogen and the remainder of HI may then be fed along path 17 to a further separator 19, which may take the form, for example, of a hydrogen-permeable membrane (as of palladium-silver), enabling only the passage of hydrogen gas to the outlet 21, and feeding the remainder of HI gas back at 23 to the decomposition chamber 11, as with the aid of a pressurizing pump 25, if desired. The hydrogen gas at 21 may be pressurized, as in a pump 27, and fed to the fuel inlet 2; whereas the liquid iodine, separated out at 15, may be fed at 29 to a heater 31 that revaporizes the iodine and then applies this oxidant to the inlet 4, in a closed-cycle system.

In accordance with the fundamental principles underlying the invention, it is important to insure, during all possible conditions of operation of the cell, that the reaction product HI is removed sufficiently fast, i.e. substantially immediately as formed, and is thus kept at an activity that is sufficiently low with respect to the activity of the hydrogen fuel at 3 (and, in many cases, low compared to the activity of the oxidant applied at 5), to insure that the second term on the right-hand side of the above equation predominates and has a value much greater than the standard potential term $E_0$.

The above is certainly true of the HI cell. In the case of other halogens, such as the HCl cell, $E_0$ has a higher voltage than that for the iodine cell, but the second term of the above equation has a negative logarithm value that adds a substantial increment of voltage to the standard potential term $E_0$, although that increment may not be larger than $E_0$. The resultant voltage E, however, is in all cases greater than $E_0$, in accordance with the method of operation underlying the invention.

Several practical ways have been found for maintaining the activity or substantially the pressure or concentration of the reaction product sufficiently low (compared with the activity of the hydrogen or other fuel) in the region of the electrolyte 7 where the reaction product is formed. One technique is to sweep excess hydrogen through that region to maintain the partial pressure of the HI at 7 sufficiently low. This is shown effected by bleeding excess hydrogen at 6 from an open end of an inverted section of the anode 3. Another successful technique has been to apply sufficient vacuum to the housing 1, or other suction, schematically represented as S, to keep the HI activity low. Other means for sweeping the reaction product away include introducing turbulence in the vicinity of the anode 3 where the reaction product is formed, or otherwise scrubbing the anode region. It is to be noted that none of these techniques, however, is applicable where the reaction product is soluble to any significant degree in the electrolytic medium, as in the case of prior-art aqueous cells and the like, as distinguished from the molten cells before mentioned.

Typical examples of experimentally obtained results employing the invention follow:

EXAMPLE 1

In a hydrogen-chlorine cell operated in a KCL—LiCl melt at approximately 400° C., the expected standard potential is approximately 1.03 volts. In an HCl cell in which the cathode was a porous carbon electrode and the anode was a palladium-silver alloy tube, the open circuit voltage was measured at 1.22 volts, illustrating the increase in voltage obtainable when the reaction product is insoluble in the electrolytic medium. When the reaction product HCl was artificially introduced into the electrolytic medium, a depression of the open-cell voltage was noted.

EXAMPLE 2

In an HCl cell similar to that described in Example 1, above, but with an anode composed of porous carbon so that the hydrogen fuel bubbled readily into the electrolyte, the open circuit voltage obtained was measured at 1.56 volts, illustrating a further increase in the obtainable voltage by sweeping excess hydrogen through the region of formation of the reaction product.

EXAMPLE 3

In a hydrogen-iodine cell in a KCl–LiCl—KI melt operated at approximately 450° C. and atmospheric pressure, in which the expected standard potential is of the order of 0.13 volt, an open circuit voltage of 0.93 volt was obtained, and this voltage was seen to depend upon the flow of the iodine oxidant, illustrating the effect of introducing turbulence into the electrolytic medium.

EXAMPLE 4

In a hydrogen-iodine cell similar to that in Example 3, but in which the iodine oxidant was carried in a stream of nitrogen gas, it was found that, without changing any of the other operating parameters of the cell, an approximately ninefold increase in the rate of nitrogen flow increased the current at short circuit from 10 ma. at 0.02 volt to 40 ma. at .14 volt, again illustrating the effect of creating a turbulence in the electrolytic medium to remove the reaction product by sweeping.

EXAMPLE 5

In a hydrogen-iodine cell similar to that in Example 4, but in which the entire cell system was enclosed in an apparatus to which vacuum could be applied, an open circuit voltage of 0.79 volt was obtained when a vacuum was applied to the system. The introduction of approximately 0.1 atmosphere pressure of the reaction product HI over the electrolytic medium was seen to depress the open circuit voltage to 0.13 volt, which voltage was restored to .79 volt upon the reapplication of the vacuum, illustrating the effect of removing the reaction product by suction.

Although the invention has preferred application in connection with the specific cells above identified, the improvement obtainable by the method underlying the invention is generically applicable to all cells wherein the reaction product has low solubility in the electrolytic medium. In all cases, through the techniques above described, the reaction product activity near the point of formation of the reaction product in the electrolytic medium is maintained low compared to the pressure of the fuel and/or oxidant to attain the novel results of the invention.

Further modifications will occur to those skilled in the art and all such are considered to fall within the spirit and scope of the invention as defined in the appended claims.

What is claimed is:

1. A method of generating power between anode and cathode electrodes of a fuel cell, that comprises, maintaining between the anode and cathode electrodes a molten electrolytic medium at an operating temperature of at least of the order of 400° C. and of the type in which the product of reaction within the cell is gaseous and substantially insoluble in the said medium, simultaneously introducing gaseous fuel and oxidant into the electrolytic medium at the anode and cathode electrodes to develop predetermined fuel and oxidant activities thereat, respectively, extracting electric current from the electrodes, and removing the gaseous reaction product from the electrolytic medium substantially immediately as formed by sweeping the reaction product out of the electrolytic medium from the said region and out of the said cell to maintain the reaction product activity near its region of formation in the medium sufficiently low compared to said developed activity of at least one of the introduced gaseous fuel and oxidant to cause the output voltage of the cell to exceed substantially the standard output voltage of the cell at the said operating temperature in the absence of said removal of said reaction product.

2. The method claimed in claim 1 and in which the said sweeping step is effected by forcing at least one of excess fuel and oxidant into the electrolytic medium near the said region.

3. The method claimed in claim 1 and in which the said sweeping is effected by applying suction to the surface of the electrolytic medium to remove the reaction product from the said region.

4. The method claimed in claim 1 and in which the electrolytic medium is a halogen-containing medium, and the oxidant is a gaseous halogen, the reaction product being maintained at the said low activity near the anode electrode.

5. The method claimed in claim 4 and in which the said halogen is iodine, the fuel comprises hydrogen, and the reaction product is HI.

6. The method claimed in claim 5, and in which the further steps are performed of thermally decomposing the HI product at the said region, separating at least one of the hydrogen and iodine from the thermally decomposed HI and re-cycling the same as gas, and re-applying at least one of the thusly separated gases to the corresponding electrode.

7. The method claimed in claim 6 and in which both of the said separated gases are applied to the corresponding electrodes.

8. The method claimed in claim 1 and in which the electrolytic medium is a halogen-containing molten medium.

References Cited

UNITED STATES PATENTS

| | | | |
|---|---|---|---|
| 963,852 | 7/1910 | Benko | 136—86 |
| 1,963,550 | 6/1934 | Greger | 136—86 |
| 3,088,990 | 5/1963 | Rightmire et al. | 136—86 |
| 3,134,698 | 5/1964 | Neipert et al. | 136—86 |
| 3,152,013 | 10/1964 | Juda | 136—86 |
| 3,287,169 | 11/1966 | Rogers | 136—86 |
| 3,294,585 | 12/1966 | Senderoff | 136—86 |
| 3,350,226 | 10/1967 | Lieb et al. | |
| 3,280,014 | 10/1966 | Kordesch | 136—86X |

FOREIGN PATENTS

| | | | |
|---|---|---|---|
| 17,994 | 1891 | Great Britain | 136—86.2 |
| 23,101 | 1892 | Great Britain | 136—86.2 |
| 12,171 | 1899 | Great Britain | 136—86.1 |
| 206,350 | 1/1909 | Germany | 136—86.2 |
| 222,283 | 12/1957 | Australia | 136—86 |

ALLEN B. CURTIS, Primary Examiner